June 7, 1927.
A. F. PIEPER
VALVE
Filed June 23, 1924
1,631,643
2 Sheets-Sheet 1
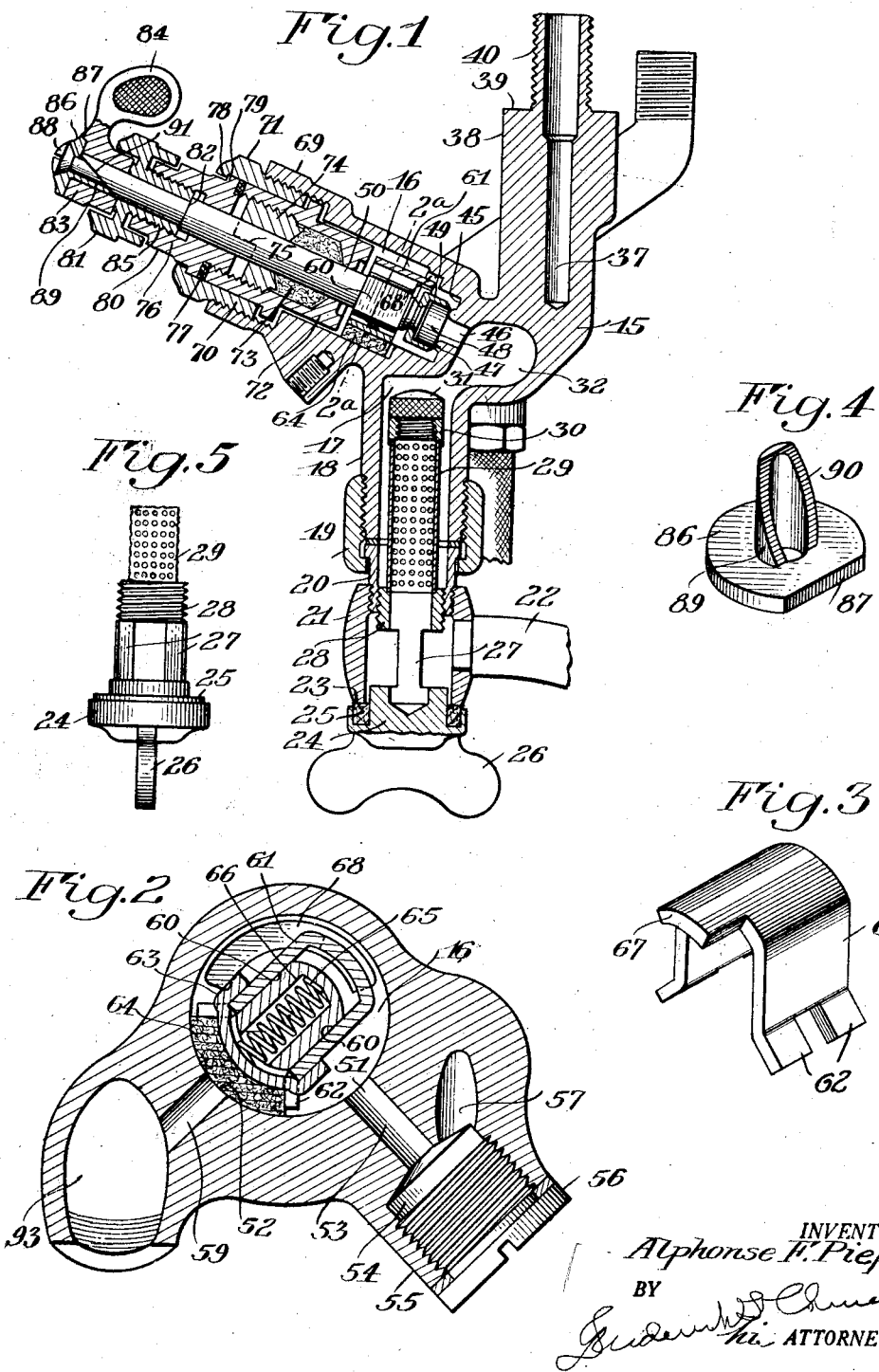
INVENTOR.
Alphonse F. Pieper
BY
ATTORNEY

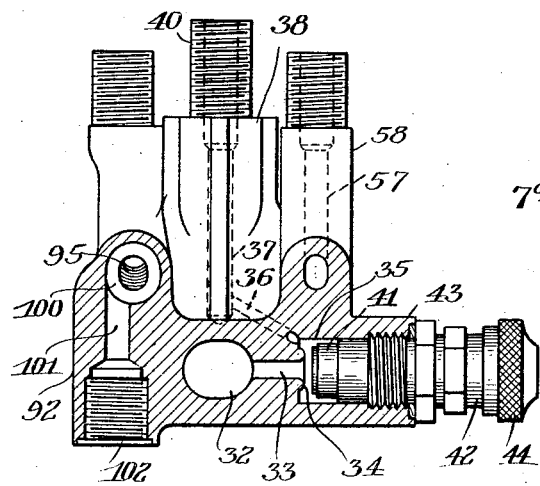
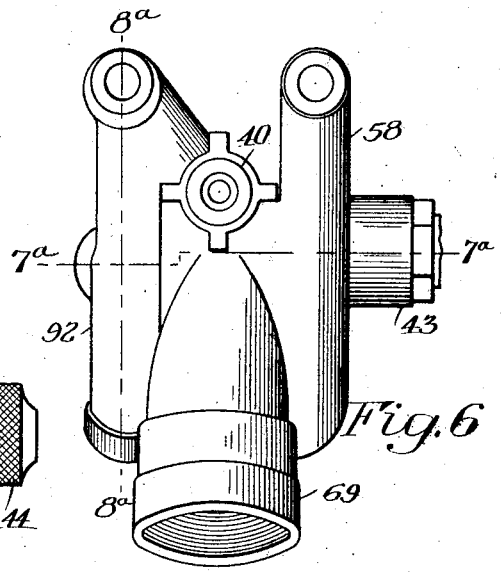
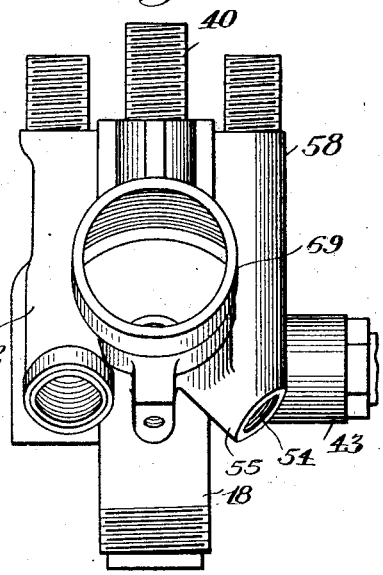
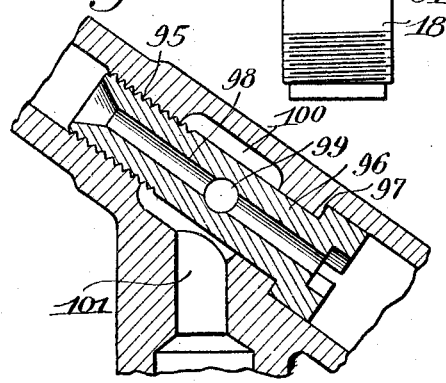

Patented June 7, 1927.

1,631,643

UNITED STATES PATENT OFFICE.

ALPHONSE F. PIEPER, OF ROCHESTER, NEW YORK.

VALVE.

Application filed June 23, 1924. Serial No. 721,685.

This invention relates to valves of the variety adapted, for example, for controlling the water supply system of fountain cuspidor apparatus, the chief object of the invention being to provide an improved valve of this nature having a more simple, practical and convenient form of construction. More specifically stated it is an object of the invention to provide a multiple type of valve having an efficient construction and arrangement of parts and valves and means for operating the same, together with a simple and advantageous aspirating device for operating a dental saliva ejecting means, and also a screen for the water supply line, all of such parts being readily detachable from the valve casing for convenient access to the same for cleaning or repair.

To these and other ends the invention resides in certain improvements and combinations of parts, all as will be hereinafter more fully described, the novel features being pointed out in the claims at the end of the specification.

In the drawings:

Figure 1 is a central sectional view through a valve embodying the present invention;

Figure 2 is an enlarged sectional view on the line 2ª—2ª in Figure 1;

Figure 3 is an enlarged perspective view of a portion of the valve body detached;

Figure 4 is an enlarged perspective view of a washer employed on the valve spindle;

Figure 5 is an enlarged side elevation of a detachable screen for the supply line;

Figure 6 is a top plan view of the valve casing with parts removed;

Figure 7 is a sectional view on the line 7ª—7ª in Figure 6;

Figure 8 is a sectional view on the line 8ª—8ª in Figure 6, showing the aspirating device;

Figure 9 is an enlarged, fragmentary, detail view of a portion of Figure 8, with additional parts in section; and Figure 10 is a front elevation of the valve casing.

Similar reference numerals throughout the several views indicate the same parts.

The present invention is capable of a variety of useful applications, being disclosed in the present instance in a form particularly suitable for controlling the water supply system of a dental fountain cuspidor and embodying various improvements over the valve disclosed in my copending application for patent, Serial No. 663,892, filed Sept. 20, 1923, for dental apparatus, showing the application of the valve to a cuspidor fixture.

The invention comprises a casing 15 capable of being advantageously formed as an integral casting comprising valve chambers as at 16 provided with various ports and valves for controlling the same, as hereinafter described. Water is supplied to the casing through a passageway 17 in a tubular extension 18. The end of the latter is externally threaded to receive a union of the usual construction indicated generally at 19. Threadedly engaged with the nipple 20 of the union is a sleeve 21 through which the water supply line 22 is laterally connected. The opposite end of sleeve 21 opens externally through a circular seat 23, this external opening being enclosed by a head 24 having a packing ring or gasket 25 cooperating with the seat. Head 24 has a wing 26 for manipulating the same and it is connected by means of posts 27 with the opposite sides of the outer end of a sleeve 28 threadedly engaged in the tubular portion 18 of the casing, or more specifically, in the outer end of nipple 20. Sleeve 21 is in line with the tubular casing extension 18 as shown and sleeve 28 has mounted in its inner end a screen for the supply line in the form of a cylinder 29 of foraminous material of any suitable nature, the inner end of which carries an internally threaded sleeve 30 in which is threadedly engaged an enclosure or cap 31. It is apparent from this construction that the screen as a whole may be readily removed by turning wing 26 of head 24 to unscrew sleeve 28. Access to the interior of screen cylinder 29 may then be had to clean the same through its open outer end between posts 27 and also through the inner end opened by the removal of cap 31.

Supply passage 17 is extended into an intermediate chamber 32, Figures 1 and 7, with which communicates a passage 33 terminating in a seat 34 in a valve chamber 35 with which communicates also a passage 36 leading substantially horizontally and thence upwardly as at 37 through a tubular extension 38. The upper end of the latter is reduced to provide a shoulder 39 beyond which is a threaded portion adapted for connection with the nozzle for supplying the drinking glass commonly found in dental cuspidor fixtures. The threaded portion 40 may be employed also to receive a nut (not shown) for clamping between it and the shoulder 39 the periphery of an opening in a suitable wall or table portion to which the valve is thereby secured, as shown in my said copending application. This distributing branch of the valve is controlled by a valve body 41, Figure 7, cooperating with seat 34 and carried by a spindle 42 threadedly engaged in a tubular extension 43 and having at its outer end an operating finger piece 44 by which it may be turned to open or close the valve.

The main valve chamber 16 is of generally cylindrical shape, having an inner end wall 45 formed with an inlet passage 46 communicating with chamber 32 already described. The end of inlet 46 in the chamber is formed with a seat 47 with which cooperates a valve disk 48 in a cup 49 fixed on the inner end of a valve spindle 50 rotatably and longitudinally movable in the chamber, as hereafter described.

Valve chamber 16 is provided in its side wall with spaced outlet ports 51 and 52. Port 51 communicates through a passage 53 with an enlargement 54 in tubular extension 55 to which access may be had by the removal of the plug 56 threadedly engaged in the outer end of the enlargement. Communicating with the latter also is a passage 57 leading upwardly and rearwardly, as shown in Figures 2 and 7, through a tubular extension 58, the upper end of which is threaded for connection with a nozzle, for example, for supplying water directly to the cuspidor bowl for flushing the same in the usual manner.

Port 52 communicates through a passage 59 with an aspirating device adapted for use as a saliva ejector as further described hereafter. These ports are selectively controlled by a valve body rotated in the cylindrical chamber 16 by rotation of the spindle 50. The latter is preferably milled off on opposite sides adjacent its inner end to provide parallel bearing surfaces 60 slidably embraced by a yoke 61, Figures 2 and 3, the ends of which are provided with pairs of divergent wing portions 62. Fixed at its end to the sides of the yoke between the wings 62 of each pair is a cross plate 63. Fixed to plate 63 between the yoke wings 62 is a valve body proper 64 of leather or other suitable material sliding in contact with the valve chamber wall to cover and uncover the ports 51 and 52. The valve body as a whole thus has a sliding movement longitudinally and transversely relative to spindle 50 and is maintained in contact with the wall of the chamber by means comprising preferably a coiled compression spring 65 carried in a recess 66 in the spindle and bearing against the latter and plate 63 of the valve body to permit movement of the latter relative to the spindle but to hold it pressed toward the side ports. Yoke 61 has a lug 67 at its inner end working in a slot 68 in the end wall of the chamber to limit the rotary movement of the valve body and spindle. The valve body is furthermore held against any substantial longitudinal movement with the spindle by engagement of the ends of the body with the ends of the chamber. It is apparent from this construction that longitudinal movement of the spindle serves to move its valve body 48 to open and close the inlet port without affecting the rotary valve 64, and furthermore that rotary or oscillating movement of the spindle serves to move valve body 64 to alternately open or close the side ports 51 and 52 without affecting the inlet valve.

The means for supporting and operating the valve spindle comprises preferably a tubular extension 69 in line with valve chamber 16. Threadedly engaged in the outer end of the extension is a sleeve 70 having a nut 71 at its outer end for turning the same. Sleeve 70 supports a gland sleeve 72 serving as a bearing for spindle 50 and carrying a supply of packing material 73. At 74 is a gland nut having at its outer end a shoulder 75. Cooperating with the latter is a shouldered sleeve 76 rotating in sleeve 70 and also providing a bearing for spindle 50. A washer 77 is interposed between sleeves 76 and 72 and the former is pressed against the latter by the engagement of a shoulder 78 on sleeve 70 with a cooperating shoulder 79 on sleeve 76. Sleeve 76 is preferably formed at 80 adjacent its outer end with a nut portion by means of which it may be rotated to force its shoulder into cooperation with the shoulder of gland nut 74 to rotate the latter and tighten the packing.

The means for shifting spindle 50 longitudinally comprises a nut 81 rotating on the reduced outer end of the spindle between a shoulder 82 thereon and a hub 83 of a handle 84 hereafter described. Nut 81 has an externally threaded portion 85 engaged in the threaded outer end of sleeve 76 so that by turning nut 81 the spindle is moved longitudinally to seat or unseat valve 48 without rotating the spindle or disturbing the outlet valve 64. The hub 83 of handle 84 is fixed to the spindle for rotating the same by means comprising preferably a washer 86 having a flattened peripheral portion 87 cooperating with a shoulder portion on the hub 83. The washer is fixed to the end of the spindle to secure the handle thereto by a screw 88 and the washer has a tubular extension 89 in line with the spindle. This extension has an inclined face 90 cooperating with an inclined end 91 of the spindle by which means the handle is secured to the latter to rotate the same and to move longitudinally therewith.

The aspirating device is located in a tubular portion 92 of the casing providing a chamber 93 with an end of which outlet port 52 communicates through the passage 59 already described. The forward end of this chamber is closed by a screw plug 94 for access to its interior. Threadedly engaged with the walls of the chamber 95 is a hollow screw 96 adapted to be inserted and removed through the forward end of the chamber. The forward end of the screw is in contact as at 97 with the shouldered wall of the chamber so that passage through the latter is confined to the bore 98 of the screw. Communicating with the screw bore is a transversely extending opening 99 communicating at its ends with a space 100 between the screw and the chamber walls with which space is connected a passage 101 leading to a threaded tubular extension 102 adapted for connection with the usual dental saliva ejecting tube.

It is apparent from the above description that valve spindle 50 may be shifted longitudinally by means of nut 81 to open or close the inlet to the multiple valve chamber. With this inlet open, the single handle 84 may be rotated to right or left to supply water either directly from the supply line to the cuspidor bowl to flush the latter or to close this connection and supply water to the aspirator to operate the saliva ejecting means, the discharge from which may be employed also to flush the cuspidor bowl so that a constant supply of water is maintained to the latter through one or the other passage ways. Manipulation of valve handle 44 serves also to control the supply of the water to the drinking glass nozzle. The construction of the valve chamber 16, its ports and valve body and the connection of the latter with the spindle is obviously simple and practical and capable of operating efficiently with little deterioration through wear. The valve spindle is fitted with handles for rotating and moving it longitudinally by simple and effective connecting means of a practical and durable nature. The casing is furthermore supplied with an effective aspirating device the parts of which are simple in construction and readily accessible and the main supply line is equipped with an advantageously constructed screen capable of being quickly removed and replaced to maintain the same unobstructed and clean.

I claim as my invention:

1. A multiple valve comprising a casing having a valve chamber therein provided with an inlet port and spaced outlet ports, a rotary spindle extending into said chamber, a valve body rotated by said spindle for cooperation with said outlet ports and movable toward and from the latter transversely of said spindle, said parts being arranged for connecting said outlet ports selectively with said inlet port and spring means connecting said spindle and valve body for maintaining the latter in contact with the chamber wall in which said outlet ports are formed.

2. A multiple valve comprising a casing having a valve chamber therein provided with an inlet port and spaced outlet ports in the side wall thereof, a valve body for cooperation with said outlet ports to connect the same selectively with said inlet port, a rotary spindle in said chamber having transversely extending bearing portions, cooperating bearing portions on said valve body guiding the latter for movement transversely of said spindle, and a spring housed in a transverse bore in said spindle and bearing against said valve body to maintain the latter in contact with said chamber wall.

3. A multiple valve comprising a casing having a valve chamber therein provided with an inlet port and spaced outlet ports in the side wall thereof, a valve body for cooperation with said outlet ports to connect the same selectively with said inlet port, a rotary spindle in said chamber formed on opposite sides thereof to provide transverse bearing surfaces, a yoke on said valve body embracing and sliding transversely on the bearing surfaces of said spindle, a coiled spring housed in a transverse recess in said spindle and bearing against said valve body to maintain the same in contact with said chamber wall, and cooperating stop parts on said yoke and casing for limiting the rotary movement of said valve body and spindle.

4. A multiple valve comprising a casing having a substantially cylindrical valve chamber therein with circumferentially spaced ports in the side wall thereof, an additional port in an end of said chamber, a valve body rotating in said chamber for selective cooperation with said side ports, a rotary and longitudinally movable spindle having a sliding connection with said valve body adapted for rotating the latter but affording relative transverse and longitudinal movement between said valve body and spindle, spring means between said spindle and valve body for maintaining the latter against said chamber wall, a valve body on said spindle for cooperation with said end port, and means for effecting rotary and longitudinal movement of said spindle.

5. A multiple valve comprising a casing having a cylindrical valve chamber therein provided with spaced ports in the side wall thereof, a rotary spindle in said chamber, a valve body having a connection with the spindle adapted to rotate the body for selective cooperation with said ports, and to afford movement of the body transversely of the spindle, spring means between said spindle and body for maintaining the latter against the chamber wall, a handle having an opening receiving the end of the spindle, a washer secured to the spindle to hold the handle thereon, and cooperating shoulder means connecting the washer with said handle and spindle for rotating the latter by said handle.

6. In a multiple valve, a casing having a valve chamber provided with an inlet and a plurality of outlets, valve means controlling said inlet and outlets, and an aspirating device comprising a chamber in said casing communicating at one end with one of said outlets, a hollow screw threadedly engaged in said aspirator chamber with a space in the latter about a portion of the screw, said screw having a transverse opening therethrough connecting its bore with said space, and means for connecting a conductor with the casing in communication with said aspirator chamber space.

7. In a multiple valve, a casing having a plurality of outlets and a supply passage, valve means controlling said outlets and passage, a supply line communicating with said passage and having an external opening in line with the latter, and a detachable screen unit comprising a sleeve threadedly engaged with the casing between said passage and supply line, a cylinder of foraminous material fixed on the sleeve and extending into said passage and having a detachable inner end closure, an externally accessible head for supporting said screen and closing said supply line opening through which said screen is inserted and removed, and means connecting said head and sleeve arranged to afford communication from said supply line to the interior of said screen cylinder.

ALPHONSE F. PIEPER.